United States Patent
Dvorak

(10) Patent No.: US 7,389,235 B2
(45) Date of Patent: Jun. 17, 2008

(54) METHOD AND SYSTEM FOR UNIFIED SPEECH AND GRAPHIC USER INTERFACES

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 862 days.

(21) Appl. No.: 10/678,551

(22) Filed: Sep. 30, 2003

(65) Prior Publication Data

US 2005/0071171 A1   Mar. 31, 2005

(51) Int. Cl.
*G10L 11/00* (2006.01)
(52) U.S. Cl. .................................... 704/275
(58) Field of Classification Search .............. 704/200, 704/275
See application file for complete search history.

(56) References Cited

U.S. PATENT DOCUMENTS

| | | | |
|---|---|---|---|
| 6,075,534 A | 6/2000 | VanBuskirk et al. | |
| 6,308,157 B1 | 10/2001 | VanBuskirk et al. | |
| 6,598,022 B2 | 7/2003 | Yuschik | |
| 2002/0010582 A1* | 1/2002 | Firman | 704/246 |
| 2003/0200080 A1* | 10/2003 | Galanes et al. | 704/200 |
| 2004/0236574 A1* | 11/2004 | Ativanichayaphong et al. | 704/231 |

OTHER PUBLICATIONS

Raman, T.V., "User Interface Principles for Multimodal Interaction", <<http://alme1.almaden.ibm.com/cs/people/tvraman/chi-2003/mmi-position.html>>.
"Multimodality", <<http://www.kirusa.com/amoutMultimodality.php>>.
BCL Technologies, "Voice and Natural Language Technology", <<http://www.bcltechnologies.com/voice/technology/technology.htm>>.

* cited by examiner

*Primary Examiner*—David Hudspeth
*Assistant Examiner*—Josiah Hernandez

(57) ABSTRACT

A method for unifying speech user interface and graphic user interface commands includes the steps of receiving (52) user entered text via a GUI, processing (54) the user-entered text, monitoring (60) the user-entered text, adding input context (62) to the user-entered text, and, updating (74, 76, and 78) a speech recognizer with the user-entered text and semantic information. Updating the speech recognizer can include the step of accepting new text information and input context to update a speech grammar (74) and recognition vocabulary of the speech recognizer. The method can include the step of updating the GUI (72) by updating GUI directives (68) and elements (70) to maintain the GUI unified with the speech grammar. The method can further include the step of forming a window (402) enabling the display of a speech interface command as a user constructs the speech interface command using the GUI (400).

20 Claims, 5 Drawing Sheets

Unified GUI and SUI Construction

10

SUI and SUI Unification Example

300

"Switch to Lookup"

"Lookup Entry With"

"name Mary Smith"

SUI and SUI Unification Example 400

Incremental Speech Command Display While navigating Through GUI 402 (Speech Command Display Window)

METHOD AND SYSTEM FOR UNIFIED SPEECH AND GRAPHIC USER INTERFACES

CROSS-REFERENCE TO RELATED APPLICATIONS

Not applicable

FIELD OF THE INVENTION

This invention relates generally to user interfaces, and more particularly to a system and method for efficiently using speech and graphical user interfaces.

BACKGROUND OF THE INVENTION

In a device with both a speech user interface (SUI) and a Graphical User Interface (GUI), the user is typically faced with learning separate command sets for each of the SUI and GUI. This increases the difficulty of accurately giving commands, especially for the SUI. In addition, speech commands are difficult to remember since they are transient and there is no persistent display of them to help the user remember. Existing systems fail to provide a mechanism to unify the command sets of the GUI and SUI so that the user need only learn a single instance of many of the commands to use in both interfaces.

U.S. Pat. No. 6,075,534 and others describe methods for displaying a dynamically changing menu to control and provide feedback on the operation of the speech recognizer in a GUI. However, no reference can be found that ensures that the GUI menus and dialog box elements are constructed in such a way that by selecting them the user essentially builds the corresponding speech command for an application.

SUMMARY OF THE INVENTION

Embodiments in accordance with the present invention provide mechanisms for unifying the command sets of a GUI and a SUI so that the user need only learn a single instance of many of the commands to use in both interfaces. This makes it easier for the user to give the correct commands to operate a device. It also provides a mechanism to display the corresponding speech command when the user uses the GUI to give the command. This further reinforces the speech command in the user's memory, reducing the errors in giving the command by speech.

In a first aspect according to one embodiment of the present invention, a method for unifying speech user interface and graphic user interface commands includes the step of receiving grammar specifying a syntax of at least one speech command and having semantic information and the step of processing the grammar to extract the semantic information for use with both a graphical user interface and a speech user interface. The step of processing can include processing the semantic information to generate semantic directives used for parsing the grammar between the graphical user interface and the speech user interface. The method can further include the step of generating graphical user interface elements corresponding to the semantic information in the grammar. The method can further include the step of generating speech grammar from the grammar and semantic information. Further note that the method can further use the grammar and the semantic information to generate visual graphical user interface elements required to implement a set of commands contained in the grammar.

In a second embodiment, a method for unifying speech user interface and graphic user interface commands can include the steps of receiving user entered text via a graphical user interface, processing the user entered text via the graphical user interface, monitoring the user entered text and adding input context to the user entered text, and, updating a speech recognizer with the user entered text and semantic information. The step of updating the speech recognizer can include the step of accepting new text information and input context to augment and update a speech grammar and recognition vocabulary of the speech recognizer. The method can further include the step of updating the graphical user interface by updating graphical user interface directives and elements to maintain the graphical user interface unified with the speech grammar. The method can further include the step of forming a window for displaying a speech interface command as it is being built using the graphical user interface.

In a third embodiment, a system having a unified speech user interface and graphical user interface can include a display for providing an output for graphic user interface elements and a processor coupled to the display. The processor can be programmed to receive grammar specifying a syntax of at least one speech command and having semantic information and to process the grammar to extract the semantic information for use with both a graphical user interface and a speech user interface. The processor can be further programmed to generate graphical user interface elements corresponding to the semantic information in the grammar. Alternatively or optionally, the processor can be programmed to generate speech grammar from the grammar and semantic information. The processor can also be programmed to use the grammar and the semantic information to generate visual graphical user interface elements required to implement a set of commands contained in the grammar. Additionally, the processor can be programmed to process the semantic information to generate semantic directives used for parsing the grammar between the graphical user interface and the speech user interface.

In a fourth embodiment, a system having a unified speech user interface and graphical user interface can include a display for providing an output for graphic user interface elements and a processor coupled to the display. The processor can be programmed to receive user entered text via a graphical user interface, process the user entered text via the graphical user interface, monitor the user entered text and adding input context to the user entered text, and update a speech recognizer with the user entered text and semantic information. The processor can further be programmed to update the speech recognizer by accepting new text information and input context to augment and update a speech grammar and recognition vocabulary of the speech recognizer. Alternatively or optionally, the processor can be programmed to update the graphical user interface by updating graphical user interface directives and graphical user elements to maintain the graphical user interface unified with the speech grammar of the speech user interface. Optionally, the processor can be programmed to form a window in the graphical user interface enabling the display of a speech interface command as a user constructs the speech interface command.

In yet other aspects, embodiments of the present invention can include a machine-readable storage having stored thereon a computer program having a plurality of code sections executable by a machine for causing the machine to perform the steps described above in the method of the first aspect or the second aspect of the invention.

DETAILED DESCRIPTION OF THE DRAWINGS

Figure 1:
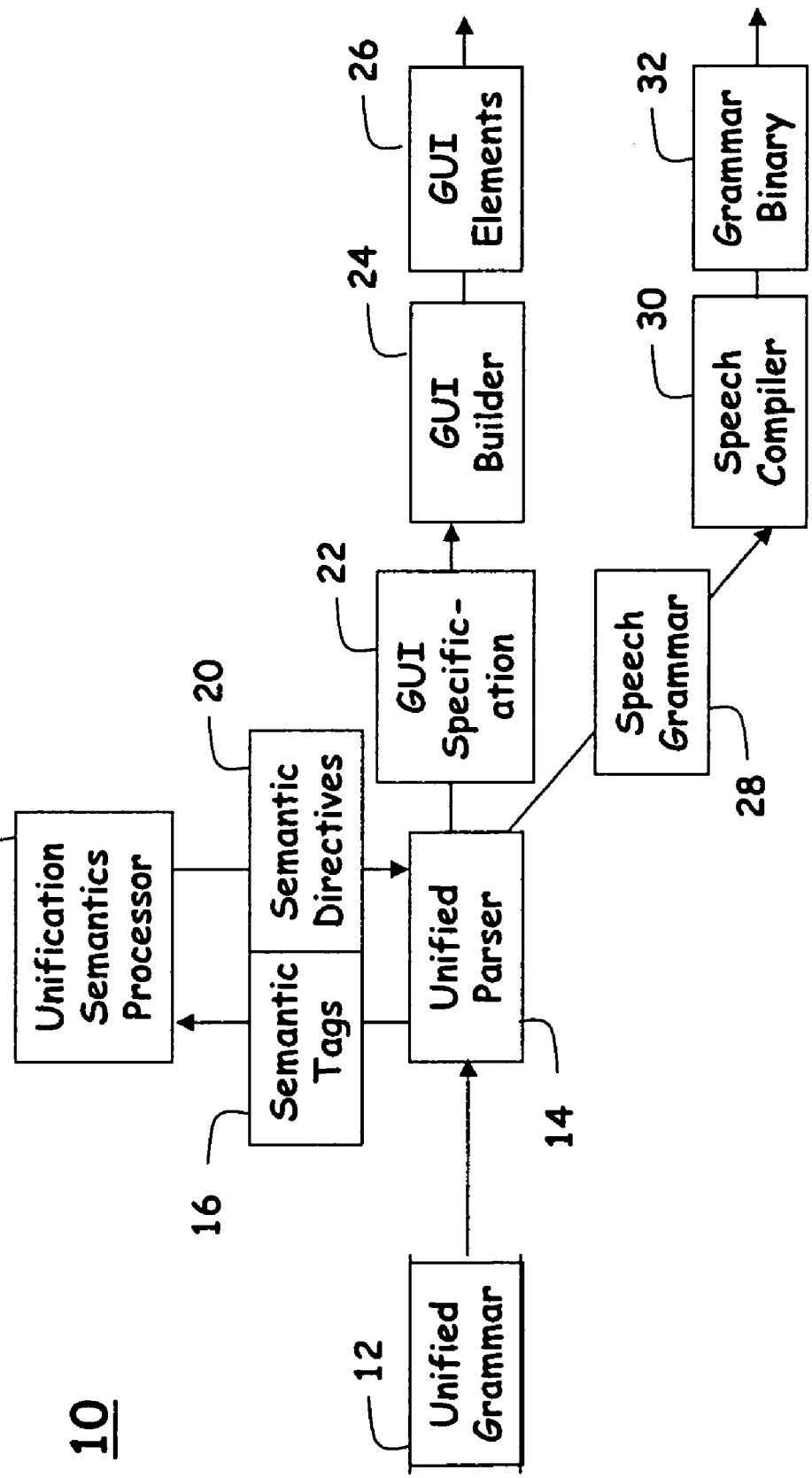
FIG. 1 is a flow chart illustrating how a unified GUI and GUI is constructed in accordance with the present invention.

Referring to FIG. 1, a method 10 for unifying the specification of the GUI and SUI command sets can include a unified grammar 12 specifying the syntax of the speech commands. This grammar can be textual or machine readable and can be annotated with semantic information. The method, process or program 10 can process the unified grammar 12 and extract the unified semantic information for use by both the SUI and the GUI. The extraction process can utilize a unified parser 14 that extracts semantic tags at block 16, processes the tags using a unification semantics processor at block 18 and generates semantic directives at block 20 for use by the unified parser 14. After processing the unified grammar and extracting the unified semantic information, the method 10 can implement a function or functions that use the interdependencies among the rules of the common or unified grammar and the semantic information contained in the grammar annotations to derive a set of menu labels, dialog box labels and choices and other GUI elements required to provide the semantically equivalent commands in a Graphical User Interface by using blocks 22, 24, and 26. The GUI elements of block 26 can be visual GUI elements required to implement the commands. At block 28, the method or program can also produce the speech grammar, including any speech-only semantic annotations. The speech grammar can be compiled at block 30 and provided as commands in grammar binary at block 32.

Figure 2:
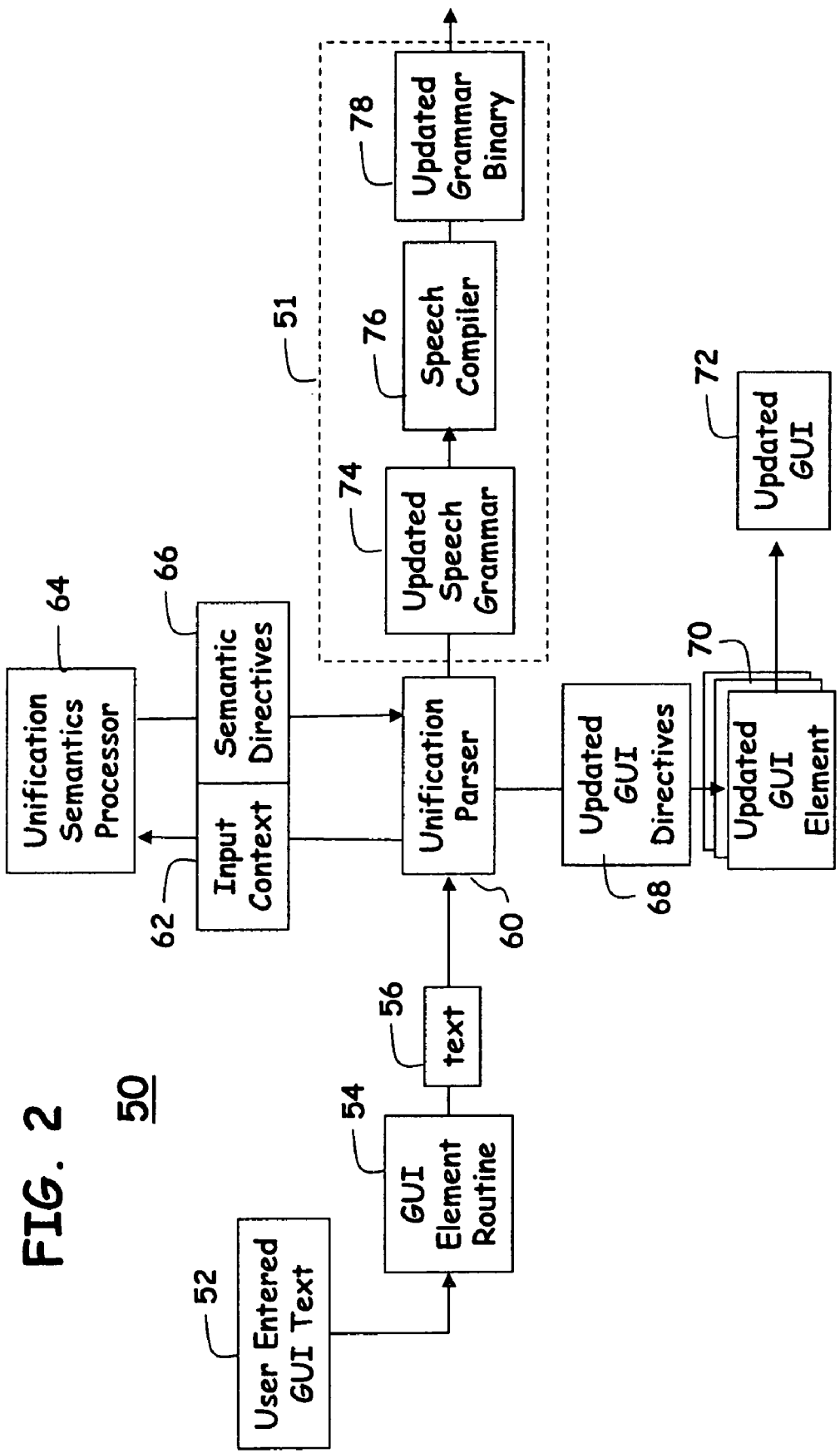
FIG. 2 is a flow chart illustrating a method of how a unified GUI and SUI is maintained in accordance with the present invention.

Referring to FIG. 2, a method or program 50 (that may be part of any of the other programs above) monitors a user's entries 52 in elements of the GUI that accept text (whether from a device's keypad/keyboard, a handwriting recognizer, etc) and then provides the newly entered information to a speech recognizer 51 along with the current entry context. The speech recognizer 51 accepts the new information and input context to augment and update its speech grammar and its recognition vocabulary. In one particular embodiment as shown in FIG. 2, the user entered GUI text 52 is processed through a GUI element routine 54 to provide text 56 for the unification parser 60 and text for updating a GUI element database or file 70 (via the unification parser 60 and block 68) in order to provide an updated GUI 72 as will be further explained below. The text 56 used by the unification parser 60 along with the input context (62) processed by the unification semantics processor 64 provides semantic directives 66 enabling the updating of the speech grammar at block 74. The speech grammar can then be compiled at block 76 to provide updated grammar binary at block 78. Similarly, the GUI elements can be updated to keep them unified with the speech grammar by receiving semantic directives (66) via the unification parser 60 to provide updated GUI directives at block 68, an updated GUI element at block 70 and an updated GUI at block 72. In other words, blocks 60-78 represent a program that updates the GUI elements to keep them unified with the speech grammar. Also note that the speech recognizer 51 can optionally be configured to include blocks 74, 76 and 78, although such other arrangements for a speech recognizer 51 are certainly contemplated within the scope of the present invention.

Figure 3:
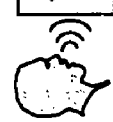
FIG. 3 is an illustration depicting an example of how a unified SUI would appear on a GUI in accordance with the present invention.
Figure 3:
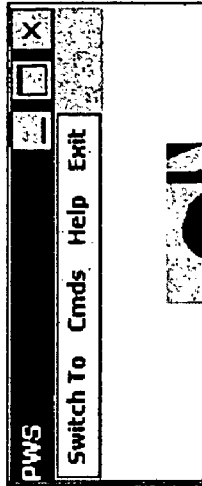
Figure 3:
Figure 3:
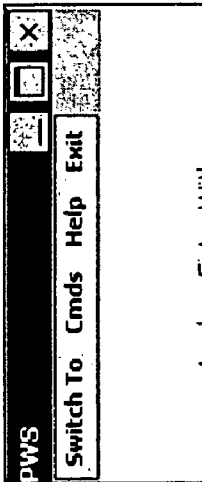
Figure 3:
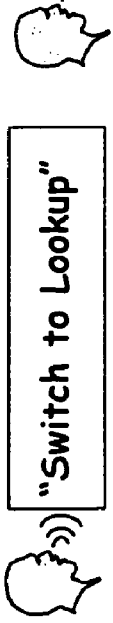
Figure 3:
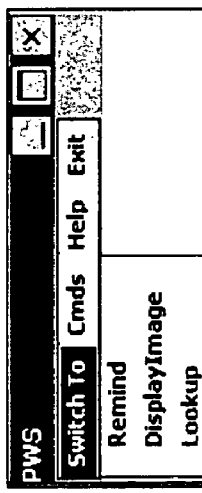
Figure 4:
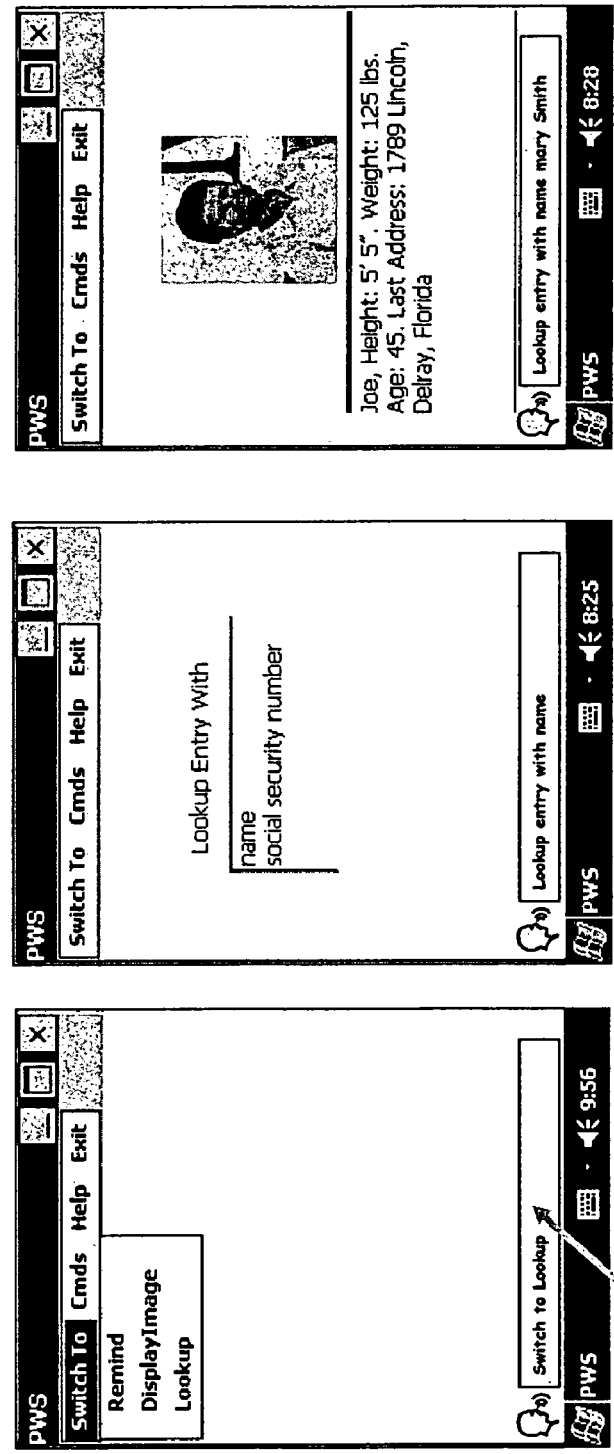
FIG. 4 is an illustration depicting an example of how a unified SUI would appear on a GUI having an incremental speech command display while navigating through the GUI in accordance with the present invention.

Referring to FIG. 3, a SUI and SUI unification example 300 is illustrated. The speech user interface commands basically match with the graphical user interface elements illustrated. As shown in the example 400 of FIG. 4, the GUI can also include a window 402 where the speech interface command is displayed as it is being constructed by the user using the GUI, further enhancing the user's memory of the speech commands. As previously explained, the system of the present invention reduces the number of commands that the user has to remember for the device interfaces since the speech interface and graphical interface will share a number of commands in common. This makes the device much easier to use by speech since every time the user uses the GUI, he will be reminded of the command for the speech interface.

Figure 5:
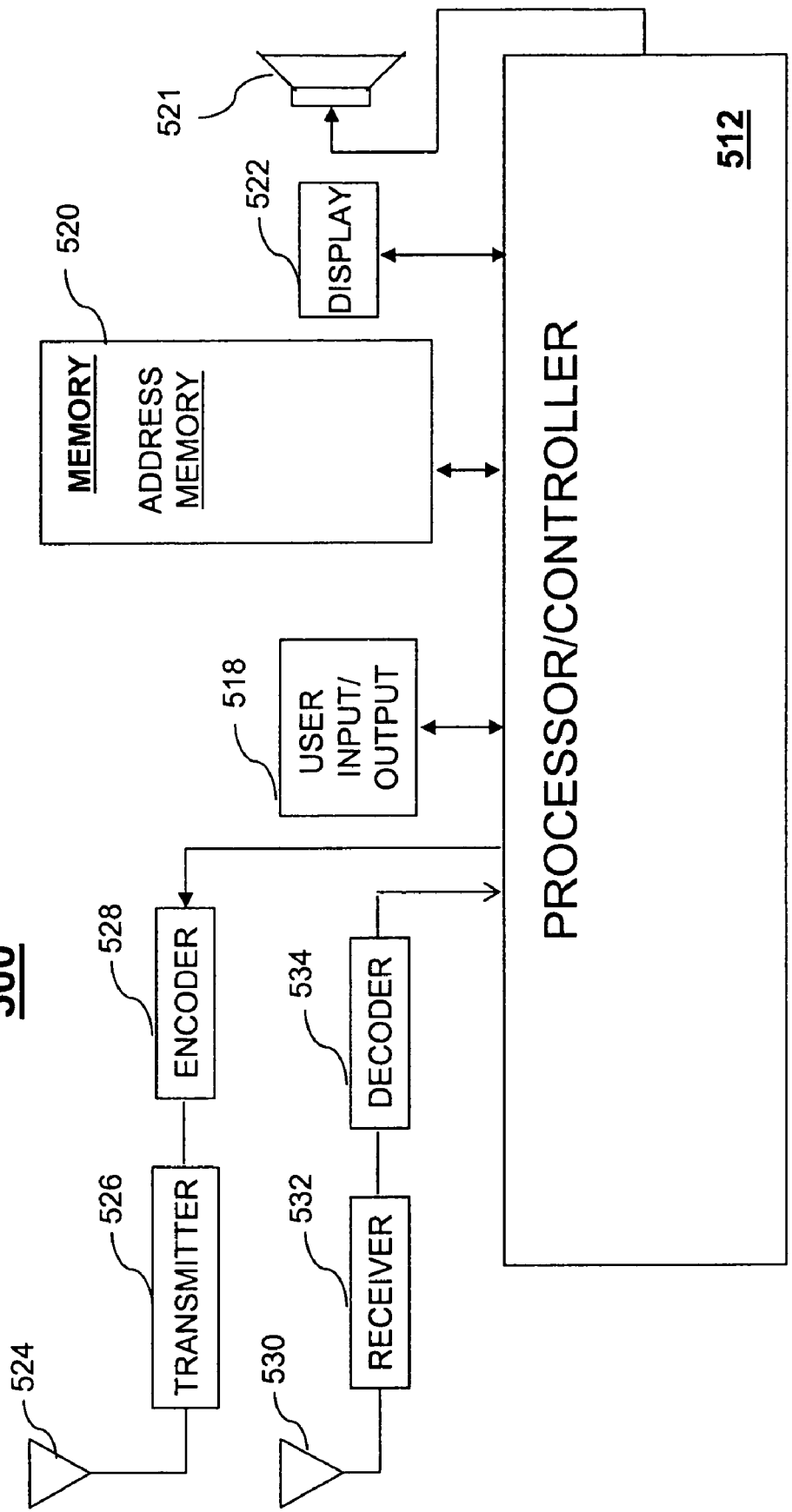
FIG. 5 is a block diagram of a portable communication device having a unified SUI and GUI in accordance with the present invention.

A unified SUI and GUI can be used on or in conjunction with any number of devices or systems to provide a user with the advantages described above. For example, a system 500 as shown in FIG. 5 can be or include a laptop computer, a desktop computer, a personal digital assistant, a mobile telephone, an electronic book, a smart phone, a communication controller, or a portable handheld computing/communication device. A communication controller can be a device that does not (by itself) directly provide a human recognizable output and does not necessarily include a display, speaker, or other output device.

The system 500 of FIG. 5 in particular illustrates a block diagram of a portable communication device such as a mobile telephone having a processor 512 programmed to function in accordance with the described embodiments of the present invention. The portable communication device can include an encoder 528, transmitter 526 and antenna 524 for encoding and transmitting information as well as an antenna 530, receiver 532 and decoder 534 for receiving and decoding information sent to the portable communication device. The device or system 500 can further include a memory 520, a display 522 for at least displaying a graphical user interface, and a speaker 521 for providing an audio output. The processor or controller 512 can be coupled to the display 522, the speaker 521, the encoder 528, the decoder 534, and the memory 520. The memory 520 can include address memory, message memory, and memory for database information. Additionally, the system 500 can include a user input/output device(s) 518 coupled to the processor 512. The input device 518 can be a microphone for receiving voice instructions that can be transcribed to text using voice-to-text logic for example. Of course, input device 518 can also be a keyboard, a handwriting recognition tablet, or some other Graphical User Interface for entering text.

As previously described, the processor can be programmed to receive grammar specifying a syntax of at least one speech command and having semantic information and to process the grammar to extract the semantic information for use with both a graphical user interface and a speech user interface. The processor can be programmed to receive user entered text via a graphical user interface, process the user entered text via the graphical user interface, monitor the user entered text and adding input context to the user entered text, and update a speech recognizer with the user entered text and semantic information. The processor can further be programmed to update the speech recognizer by accepting new text information and input context to augment and update a speech grammar and recognition vocabulary of the speech recognizer. Alternatively or optionally, the processor can be programmed to update the graphical user interface by updating graphical user interface directives and graphical user elements to maintain the graphical user interface unified with the speech grammar of the speech user interface. Optionally, the processor can be programmed to form a window in the graphical user interface enabling the display of a speech interface command as a user constructs the speech interface command.

In light of the foregoing description of the invention, it should be recognized that the present invention can be realized in hardware, software, or a combination of hardware and software. A method and system for unifying a speech user interface and graphical user interface according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. A computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A method for unifying speech user interface and graphic user interface commands, comprising the steps of:
   receiving grammar specifying a syntax of at least one speech command and having semantic information;
   processing the grammar to extract the semantic information for use with both a graphical user interface and a speech user interface;
   receiving a user input to select at least one component in the graphical user interface during a navigation of the graphical user interface;
   audibly receiving the at least one speech command associated with the at least one component from the speech user interface;
   generating semantic directives from user supplied input text, the user input, and the at least one speech command to update a recognition vocabulary for recognizing one or more non-unified components of the graphical user interface;
   parsing the grammar between the graphical user interface and the speech user interface in accordance with the semantic directives to unify the graphical user interface with the grammar from the recognition vocabulary;
   visually presenting the at least one speech command in a visual prompt of the graphical user interface responsive to the step of audibly receiving; and
   building a corresponding speech command for a plurality of speech commands associated with a plurality of components,
   wherein the corresponding speech command is a single instance of a plurality of speech commands associated with a selection of one or more components of the graphical user interface during the navigation of the graphical user interface.

2. The method of claim 1, wherein the method further comprises the step of generating graphical user interface elements corresponding to the semantic information in the grammar.

3. The method of claim 1, wherein the method further comprises the step of generating speech grammar from the grammar and semantic information.

4. The method of claim 1, wherein the method further uses the grammar and the semantic information to generate visual graphical user interface elements required to implement a set of commands contained in the grammar.

5. A method for unifying speech user interface and graphic user interface commands, comprising the steps of:
   receiving user entered text via a graphical user interface;
   processing the user entered text for semantic directives via the graphical user interface;
   monitoring the user entered text and adding input context associated with a navigation in the graphical user interface corresponding to the user entered text;
   updating a speech recognizer with the user entered text for recognizing one or more non-unified components of the graphical user interface from the semantic directives;
   audibly receiving at least one speech command associated with the selection of the at least one component from the navigation of the speech user interface;
   visually presenting the at least one speech command in a visual prompt of the graphical user interface responsive to the step of audibly receiving; and
   building a corresponding speech command for a plurality of speech commands associated with a plurality of components and non-unified components,
   wherein the corresponding speech command is a single instance of a plurality of speech commands associated with a selection of one or more components of the graphical user interface during the navigation of the graphical user interface.

6. The method of claim 5, wherein the step of updating the speech recognizer comprises the step of accepting new text information and input context to augment and update a speech grammar and recognition vocabulary of the speech recognizer.

7. The method of claim 5, wherein the method further comprises the step of updating the graphical user interface.

8. The method of claim 7, wherein the step of updating the graphical user interface comprises the steps of updating graphical user interface directives and elements to maintain the graphical user interface unified with the speech grammar.

9. The method of claim 5, wherein the method further comprises forming a window for displaying a speech interface command as it is being built using the graphical user interface.

10. A system having a unified speech user interface and graphical user interface, comprising:
- a display for providing an output for graphic user interface elements; and
- a processor coupled to the display, the processor programmed to:
  - receive grammar from a user input text specifying a syntax of at least one speech command and having semantic information;
  - process the grammar from the text to extract the semantic information for use with both a graphical user interface and a speech user interface;
  - receive a user input to select at least one component in the graphical user interface during a navigation of the graphical user interface;
  - audibly receive the at least one speech command associated with the at least one component from the speech user interface;
  - visually present the at least one speech command in a visual prompt of the graphical user interface responsive to the step of audibly receiving; and
  - build a corresponding speech command for a plurality of speech commands associated with a plurality of non-unified components in accordance with the semantic information,
  - updating a recognition vocabulary using the semantic information for recognizing the plurality of non-unified components of the graphical user interface;
  - wherein the corresponding speech command is a single instance of a plurality of speech commands associated with a selection of one or more components of the graphical user interface during the navigation of the graphical user interface.

11. The system of claim 10, wherein the processor is further programmed to generate graphical user interface elements corresponding to the semantic information in the grammar and navigate to the graphical user interface elements in response to receiving a speech command.

12. The system of claim 10, wherein the processor is further programmed to generate speech grammar from the grammar and semantic information.

13. The system of claim 10, wherein the processor is further programmed to use the grammar and the semantic information to generate visual graphical user interface elements required to implement a set of commands contained in the grammar.

14. The system of claim 10, wherein the processor is further programmed to process the semantic information to generate semantic directives used for parsing the grammar between the graphical user interface and the speech user interface.

15. A system having a unified speech user interface and graphical user interface, comprising:
- a display for providing an output for graphic user interface elements; and
- a processor coupled to the display, the processor programmed to:
  - receive user entered text via a graphical user interface;
  - process the user entered text via the graphical user interface;
  - monitor the user entered text and adding input context associated with a selection of at least one unified component in the graphical user interface to the user entered text during a navigation of the graphical user interface; and
  - generate semantic directives from the user entered text to update a recognition vocabulary for recognizing one or more non-unified components of the graphical user interface
  - update a speech recognizer with the user entered text and semantic information for recognizing a plurality of unified and non-unified components of the graphical user interface;
    - audibly receive at least one speech command associated with the selection of at least one component from the speech user interface;
    - visually present the at least one speech command in a visual prompt of the graphical user interface responsive to the step of audibly receiving; and
    - build a corresponding speech command for a plurality of speech commands associated with a plurality of unified components and non-unified components,
    - wherein the corresponding speech command is a single instance of a plurality of speech commands associated with a selection of one or more components of the graphical user interface during the navigation of the graphical user interface.

16. The system of claim 15, wherein the processor is further programmed to update the speech recognizer by accepting new text information and input context to augment and update a speech grammar and recognition vocabulary of the speech recognizer.

17. The system of claim 15, wherein the processor is further programmed to update the graphical user interface by updating graphical user interface directives and graphical user elements to maintain the graphical user interface unified with the speech grammar of the speech user interface.

18. The system of claim 15, wherein the processor is further programmed to form a window in the graphical user interface enabling the display of a speech interface command as a user constructs the speech interface command.

19. A machine readable storage, having stored thereon a computer program having a plurality of code sections executable by a machine for causing the machine to perform the steps of:
- receiving grammar specifying a syntax of at least one speech command and having semantic information; and
- processing the grammar to extract the semantic information for use with both a graphical user interface and a speech user interface
- receiving a user input to select at least one component in the graphical user interface during a navigation of the graphical user interface;
- audibly receiving the at least one speech command associated with the at least one component from the speech user interface;
- visually presenting the at least one speech command in a visual prompt of the graphical user interface responsive to the step of audibly receiving;
- updating a speech recognizer with the user entered text and semantic information for recognizing a plurality of non-unified components of the graphical user interface; and
- building a corresponding speech command for a plurality of speech commands associated with a plurality of components and non-unified components,
- wherein the corresponding speech command is a single instance of a plurality of speech commands associated with a selection of one or more components of the graphical user interface during the navigation of the graphical user interface.

20. A machine readable storage, having stored thereon a computer program having a plurality of code sections executable by a machine for causing the machine to perform the steps of:

receiving user entered text via a graphical user interface;

processing the user entered text via the graphical user interface;

monitoring the user entered text and adding input context associated with a selection of at least one component in the graphical user interface to the user entered text;

updating a speech recognizer with the user entered text and semantic information for recognizing a plurality of unified and non-unified components of the graphical user interface;

audibly receiving at least one speech command associated with the selection of the at least one component from the speech user interface;

visually presenting the at least one speech command in a visual prompt of the graphical user interface responsive to the step of audibly receiving; and building a corresponding speech command for a plurality of speech commands associated with a plurality of unified components and non-unified components, wherein the corresponding speech command is a single instance of a plurality of speech commands associated with a selection of one or more components of the graphical user interface during the navigation of the graphical user interface.

* * * * *